March 18, 1958  W. G. HOFFMAN  2,826,944
APPARATUS FOR PREVENTING WORKPIECE SCORING
ON WITHDRAWAL OF A BORING TOOL
Filed May 16, 1955  2 Sheets-Sheet 1
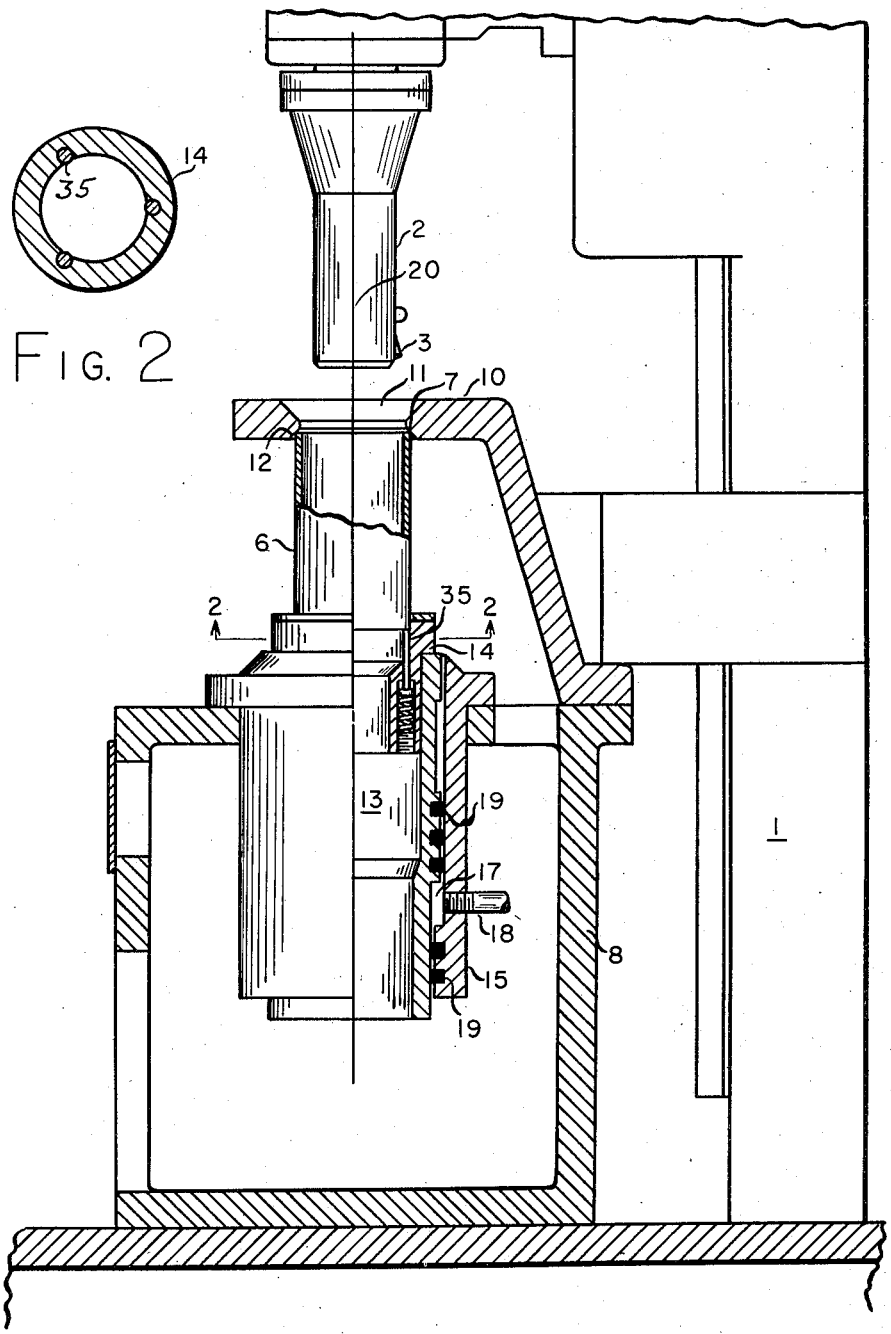
INVENTOR.
WAYNE G. HOFFMAN
BY
Attorney

*INVENTOR.*
WAYNE G. HOFFMAN
BY
Attorney

United States Patent Office 2,826,944
Patented Mar. 18, 1958

2,826,944

APPARATUS FOR PREVENTING WORKPIECE SCORING ON WITHDRAWAL OF A BORING TOOL

Wayne G. Hoffman, Moline, Ill., assignor to The Moline Tool Company, Moline, Ill., a corporation of Illinois Application May 16, 1955, Serial No. 508,627

6 Claims. (Cl. 77—4)

In boring sleeves and cylinders the boring bar revolves, and a tool carried by the boring bar cuts along a spiral generated by the relatively rapid revolution of the bar and the slow downward movement of the boring bar. When the operation is completed, the tool is in contact with the lower end of the sleeve, the boring bar extending through the sleeve.

If we now elevate the boring bar, the tool will scratch a vertical line across the machined surface. To avoid this the present invention involves new concepts in boring bars and work holders that cooperate in a manner to avoid the objectionable scratch on the finished bore caused by the removal of the boring bar from the bore after the boring operation is finished.

The invention is particularly well adapted for use in boring sleeves.

It has been proposed to stop the boring bar in a particular angular position, then to move the sleeve and boring tool relative to each other in that direction by moving the sleeve clamping means along a rail as in Patent 2,146,446, granted to W. D. Schmidt et al. on February 7, 1939. This entails a complicated construction because the rotating boring bar must be stopped in a particular position.

The novel boring bar provides a force that is constantly ready to move the work piece when the piece is unclamped in a direction to break contact between the cutter carried by the boring bar and the surface of the bore.

The work holder provides for aligning the sleeve so that its axis coincides with that of the boring bar and then clamping the sleeve in that position during the boring operation. When the revolving boring bar, which begins boring at the top, has completed boring the sleeve and is in its lower-most position, the boring bar stops rotating, the clamp holding the sleeve axis in the spindle axis is released, and the force provided by the novel boring bar moves the sleeve out of contact with the cutter carried by the boring bar to a position eccentric to the axis of the boring bar. The boring bar is then elevated without the possibility of marring the finished interior surface of the sleeve by the cutter.

The object of the invention is to provide an apparatus that will align a sleeve with the axis of a boring bar before the boring of the sleeve is begun and which, on completion of the boring operation, with the boring bar at rest, will move the sleeve out of contact with the cutter carried by the boring bar regardless of the angular position of the boring bar in which the cutter came to rest.

A further object is to provide conical centering devices to hold a sleeve while it is being bored, and biasing means tending to move the sleeve in the direction the cutter points when the centering means are released.

A further object is to provide conical centering devices which when moved toward each other will hold a sleeve in a set vertical position, a means becoming effective upon separation of said centering devices to lift the sleeve out of the lower conical device, whereupon means carried by the spindle will move the sleeve to throw its axis out of the spindle axis.

Figure 1 shows in elevation, partly in section, a boring machine to which the invention has been applied.

Figure 2 is a horizontal section taken along lines 2—2 in Figure 1.

Figure 4:
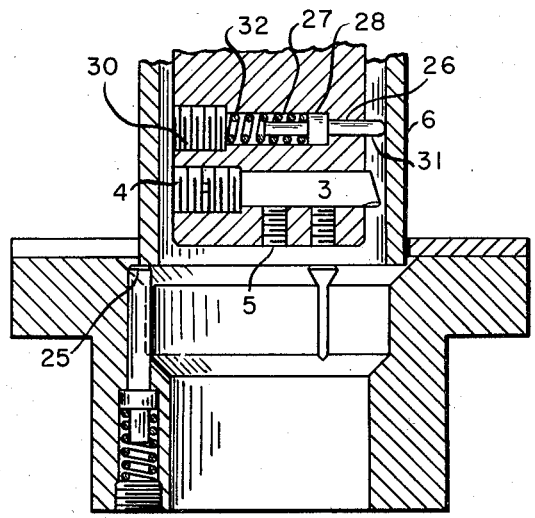
Figure 4 shows the same parts as are shown in Figure 3 when the work piece is unclamped.

In these drawings, 1 indicates a boring tool of the usual type. Such boring tools have a vertical boring bar 2 that carries a cutting tool 3. The cutting tool may be moved outward relative to the boring bar by turning the plug 4 threaded into the boring bar and when adjusted for the precise diameter to be bored, is locked into place by screw 5.

The work piece 6 is here shown as a metal cylinder that is oriented during clamping by the engagement of the clamp with the outer edges 7 of the sleeve 1.

The work piece 6 is locked in a fixture 8 that is mounted on the machine tool 1 or on the base on which that tool rests. This fixture has an overhanging portion 10 having a hole 11 through which the boring bar may pass.

The lower support for the work piece consists of a hollow ram 13 carrying a ring-shaped piece 14 that has a central hole for chips to fall through and a conical recess 16 which, when the ram is elevated, will center the lower edge of the work piece 6.

The ram 13 is mounted in a cylindrical housing 15. Piston rings 19 carried by the ram and the housing respectively seal off a space 17. The cylindrical housing 15, the hollow ram 13 and the ring-shaped piece 14 are so aligned relative to the axis of the boring bar that the axis of the ring-shaped piece 14 and the boring bar 2 always coincide. If fluid under pressure is fed through pipe 18 into space 17 the ram 13 is elevated, the work piece is clamped in position between the ram and the overhanging piece 10.

The work piece may be centered relative to the axis of the boring bar at either or both ends of the bore. Thus in the form of the invention shown in the drawings the underside of the hole 11 in the overhanging portion 10 has a conical surface 12. As the work piece 6 is elevated the upper edge 7 engages the conical hole and is centered thereby.

Figure 3:
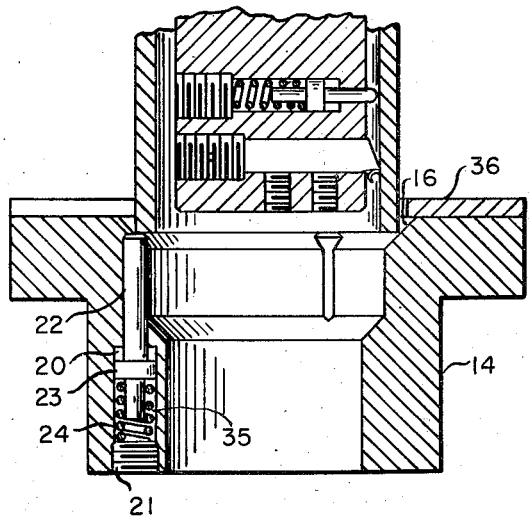
Figure 3 is a fragmentary vertical section along lines 3—3, drawn to a larger scale, when the work piece is clamped in place.

The lower end of the work piece may be centered by the conical surface 16 shown in Figure 3.

The piece may thus be centered at either end or it may be centered at both ends simultaneously.

When the piece is clamped the boring bar 2 revolves and slowly moves downward. The cutter 3, engaging the inner surface of the sleeve, bores the inside of the sleeve to the desired diameter.

As the bar descends, the cutter 3 passes below the bottom rim of the work piece 6. The boring operation is now finished.

To prevent the tool 3 from scratching the surface of the work piece as the boring bar 2 is elevated, the work piece must be moved before the boring bar is elevated so that its axis no longer coincides with the axis 20 of the boring bar. Furthermore, if the boring bar stops with the tool in the position shown, the work piece must be moved in the direction of the tool 3—that is to the right in Figures 1, 3, and 4.

The spindle 2 may come to rest in any angular position, so the device moving the work piece must be prepared to move it in any direction on a horizontal plane.

The invention accomplishes this by three successive steps.

First, the work piece 6 is unclamped by allowing the ram 13 to descend. The work piece moves bodily downward. This frees edge 7 of the work piece from the upper conical locating-surface 12.

Second, the work piece is lifted up out of the lower cone 16 and supported on a horizontal surface.

Third, the work piece is moved along this horizontal surface in the direction in which the cutter points.

The boring bar is then litfed. The apparatus making the second and third steps possible will now be described.

The ring-shaped piece, as shown in Figure 2, has a number of vertical holes 35. Three equally spaced holes are shown: there could be a larger number. As shown in Figures 1, 3 and 4 the lower part of hole 35 is enlarged as shown at 20 and the lower part of the enlarged portion 20 is closed by a plug 21.

In each hole a plunger 22 having an enlarged collar 23 is free to move. A compressed spiral spring 24, reacting against the plug 21 and the collar 23, elevates the plunger. The upward bias can be controlled by the position of the plug and the stiffness of the spring 24 selected. The springs are so selected and regulated that the combined upward thrust on all plungers taken together exceeds the weight of the work piece.

Each plunger 22 ends in a flat upper surface 25 which, in its uppermost position, projects above the top of the inclined conical surface 16 of the piece 14.

The second step, then, is accomplished automatically as soon as the ram 13 is lowered. The plungers rise from the position shown in Figure 3 to that shown in Figure 4. The work piece now rests on the flat upper surface of the plungers and can readily be slid horizontally.

Directly above the cutter on the boring bar is a hole 26 having an enlarged portion 27 forming a shoulder for a collar to bear against. The enlarged portion 27 is closed by a plug 30. A horizontal pusher 31 has a collar 28 that can bear against the shoulder 28 and a spring 32 serves to push the pusher toward that position.

When the work piece is clamped in place as shown in Figure 1, the horizontal pusher is bearing against the work piece 6. The polished end of the pusher rides on the finish-bored portion of the work piece but the pusher cannot move the work piece that is centered by the conical surfaces 12 and 16.

When the boring bar has stopped and the ram 13 has been lowered, unclamping the work piece and the plungers 22 have elevated it so that it sits only on the horizontal top surfaces 25 of the plungers, the third step, the horizontal shift of the work piece from the position shown in Figure 3 to that shown in Figure 4 takes place.

The tool 3, as will be noted from Figure 4, is now no longer in contact with the cylindrical surface of the work piece and may be elevated without marring the inner surface of the sleeve.

The piece 14 may carry a locating piece 36 which permits an operator to set a new work piece on the pins 22 in approximate position.

In using the invention, the boring bar 2 is first elevated and the ram 13 is allowed to move to its lower position. The springs 24 lift the pins 22. The operator now sets a sleeve 6 that is to be bored on these pins, the locating piece 36 roughly locating the work piece. Fluid under pressure is now fed through line 18 to space 17. The ram 13 rises and lifts the work piece. As the edges 7 of the work piece engage the conical surfaces 12 the upper edge of the work piece is centered. The pressure of the ram, through pins 22 against the lower end of the work piece now mounts higher than the capacity of the springs 24 and the pins 22 recede into the ring 14. The lower edge 7 of the sleeve now bears against conical surface 16.

The boring bar now starts rotating. As the boring bar is gradually lowered while boring the inner surface of the sleeve, the tip of pusher 31 engages the finished inner surface compressing spring 32.

When the boring is completed, the boring bar is stopped from further rotation. The fluid from space 17 is allowed to escape through pipe 18, the ram 13 sinks, the work piece lowers away from the conical surface 12. The springs 24 now expand to raise the pins 22, and lift the work piece out of contact with the conical surface 16. The sleeve can now be moved sideways without much effort. The spring 32 expands and moves the pusher 31. This is necessarily in the direction of the cutter 3 and the entire sleeve slides on the flat top of pins 22 out of contact with the cutter. The plunger is now raised and the sleeve 6 may be removed.

I claim:

1. In a vertical boring machine, a conical work-centering and supporting surface, a plurality of vertical holes in said conical surface, vertical pins having horizontal top surfaces movable in said holes, means limting the upward movement of the top surface of each pin to a horizontal plane above said conical surface, means stronger than the weight of said work piece of elevate the pins so that the work piece can move laterally on the horizontal top surfaces of said pins.

2. In a boring machine, a vertically movable boring bar, a bearing surface against which the top of a work piece may bear, a vertically movable ram whose axis is substantially the same as that of said boring bar, a conical surfaced work-centering and supporting piece carried by said ram, a plurality of vertical holes in said conical surface, vertical pins having horizontal top surfaces movable in said holes, means limiting the upward movement of each pin to a horizontal plane above said conical surface, means stronger than the weight of said work piece to elevate the pins so that the work piece can move laterally on the horizontal top surfaces of said pins when said ram is lowered to release the work piece from contact with said bearing surface.

3. In a boring machine, a conical locating surface for the upper ends of work pieces, a vertically movable boring bar extending down through said conical locating surface, a vertically movable ram whose axis is substantially the same as that of said boring bar, a conical surfaced work-centering and supporting piece carried by said ram and serving to clamp the work piece between said two conical surfaces when the ram is elevated, a plurality of vertical holes in said conical surface, vertical pins having horizontal top surfaces movable in said holes, means limiting the upward movement of each pin to a horizontal plane above said conical surface, means stronger than the weight of said work piece to elevate the pins so that the work piece can move laterally on the horizontal top surfaces of said pins when said ram is lowered to break contact of the work piece with said locating surface for the upper end of said work piece.

4. A sleeve boring machine, comprising, in combination, a vertical boring bar, a cutting tool carried by said boring bar, a conical surface on said machine whose axis coincides with that of the boring bar and which is adapted to engage the outer upper edge of a sleeve to center it relative to the boring bar axis, a second conical surface whose axis coincides with that of the boring bar, means to elevate said second conical surface to engage the outer lower edge of the same sleeve to engage and orient said work piece, vertical holes in said lower conical surface, a plunger in each of said holes bearing against the under side of said sleeve, means capable of elevating said plungers relative to said conical surface to lift said sleeve out of the conical surface when the second conical surface is lowered, relative to the first conical surface a pusher carried in a horizontal hole in said boring bar bearing against the inner surface of said sleeve and adapted to move said sleeve away from the cutting tool when it has been elevated by the plungers.

5. In a vertical boring machine a rigid support for a cylindrical work piece, a conical recess in said support which will center a cylindrical work piece forced downward into said recess, a plurality of plungers extending up through holes in said support, means to move said plungers upward with enough force to jointly support the work piece, means to limit the upward movement of each plunger so that they will support the cylindrical work piece on a horizontal plane above the rigid support until the work piece is forced downward whereby the plungers will recede and the work piece be supported in said conical recess.

6. A boring spindle having means tending to move a work piece out of contact with the cutter, comprising, in combination, a vertical boring spindle, a hole extending horizontally into said spindle located above said cutter and in the same vertical plane, a shoulder in said hole, a plunger movable in said hole having a shoulder and projecting in the same direction as said cutter and beyond said cutter when the shoulder on said plunger engages the shoulder in said hole, a compressed spring in said hole biasing the plunger toward shoulder engaging position and exerting a force on the work piece tending to move it out of contact with said cutter.

References Cited in the file of this patent

UNITED STATES PATENTS

| | | |
|---|---|---|
| 1,058,840 | Binns | Apr. 15, 1913 |
| 1,926,967 | Blood | Sept. 12, 1933 |
| 2,056,706 | Blazek et al. | Oct. 6, 1936 |
| 2,349,400 | Beckwith | May 23, 1944 |
| 2,483,096 | Jaworowski et al. | Sept. 27, 1949 |